H. H. FREY.
AUTOMOBILE HORN.
APPLICATION FILED JUNE 29, 1912.
1,088,893.
Patented Mar. 3, 1914.
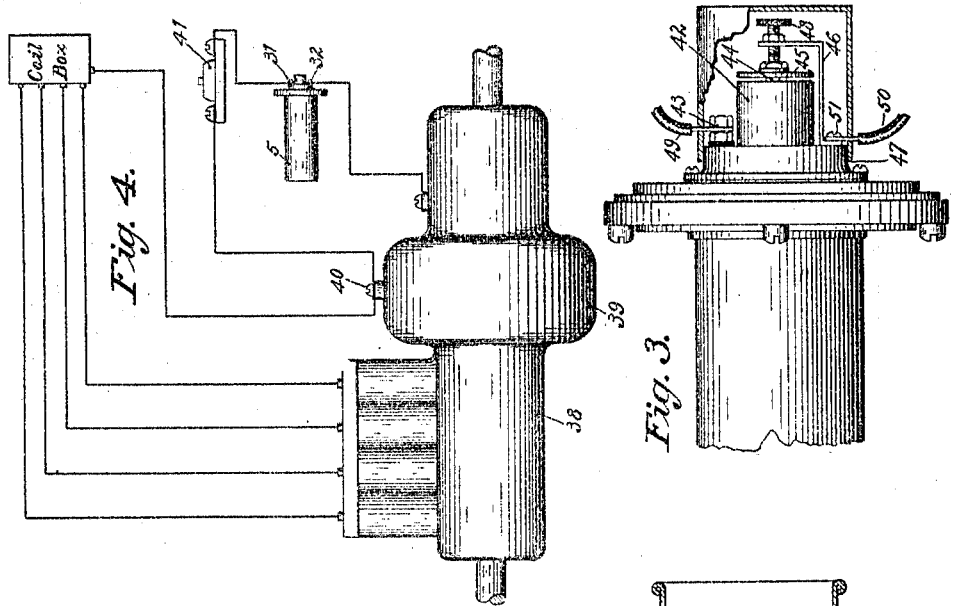
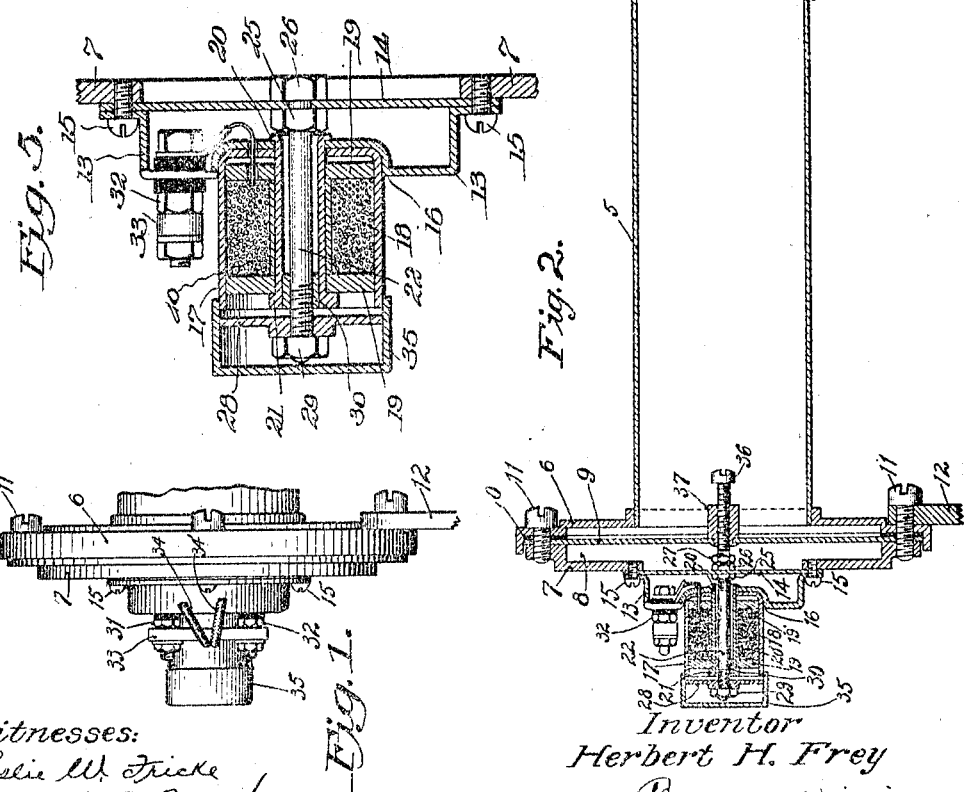
Witnesses:
Leslie W. Fricke
Robert F. Bracke
Inventor
Herbert H. Frey
By Brown & Williams
Attorneys

UNITED STATES PATENT OFFICE.

HERBERT H. FREY, OF CHICAGO, ILLINOIS.

AUTOMOBILE-HORN.

1,088,893.  Specification of Letters Patent.  Patented Mar. 3, 1914.

Application filed June 29, 1912. Serial No. 706,564.

*To all whom it may concern:*

Be it known that I, HERBERT H. FREY, a citizen of the United States, residing at Chicago, in the county of Cook and State of Illinois, have invented a certain new and useful Improvement in Automobile-Horns, of which the following is a full, clear, concise, and exact description, reference being had to the accompanying drawings, forming a part of this specification.

My invention relates to automobile horns and has for its object provision of an electrically operated horn which is efficient and one which can nevertheless be economically manufactured.

The horn of my invention can, if desired, be connected with a source of ignition current for the automobile with which it is associated or, if desired, it may receive its operating current from batteries provided for that purpose.

The automobile horn shown in the drawings is particularly adapted to receive its operating current from an alternating current ignition magneto although I wish it to be understood that its use is not so limited, as by provision of an extremely simple circuit breaking arrangement my horn is adapted to be operated by direct current.

Simplicity is a feature of my horn construction. The parts are such that sheet metal construction is used throughout.

My invention will be more clearly understood by referring to the accompanying drawings forming part of this specification, in which—

Figure 1 is a side elevational view of an automobile horn embodying my invention; Fig. 2 is a longitudinal cross-sectional view thereof; Fig. 3 is a view partly in section and partly in elevation showing the horn embodying my invention equipped for use with direct current; Fig. 4 is a diagrammatic representation of the electrical connections in an automobile equipment where an alternator furnishes current for ignition purposes and for operating the horn; Fig. 5 is an enlarged view, illustrating the operating mechanism shown in Fig. 2.

Similar reference characters are applied to similar parts throughout the several views.

Referring now to Figs. 1 and 2, a sheet metal cylinder or tube is shown at 5. While I prefer to have this tube of the conformation shown in the drawings, it is apparent that it might be given any desired shape without departing from my invention. Secured to and carried by the cylinder 5 is the cup-shaped member 6. This member 6 and a plate 7 form the diaphragm chamber 8. Secured between the member 6 and the plate 7 is the sounding diaphragm 9. Suitable packing or insulation 10 may be disposed on one or both sides of the diaphragm 9 if desired. The cup-shaped member 6, the plate 7, the diaphragm 9, and the packing 10 are securely held in position by means of a plurality of screws 11. Any suitable means indicated at 12 may be provided for securing the horn to the automobile. The end closure for the diaphragm chamber is indicated at 13. Between the end closure 13 and the plate 7 there is interposed the spring diaphragm 14. The end closure and the spring diaphragm are secured by means of screws 15 engaging the plate 7. The end closure is sunk as shown at 16 to receive the end of a coil housing or bell magnet 17. Within the housing 17 there is disposed the bell magnet coil 18. The coil 18 is mounted on a spool 20' between the fiber disks 19 and 19'. A tube 20 extends through the disks 19 and 19', coil 18, and apertures in the housing 17 and the end closure 13. The tube 20 which is spread or riveted inside the closure 13, as shown, is provided with a shoulder 21 to engage the disk 19. It will thus be seen that by a simple arrangement, the housing 17 and the parts carried thereby are securely held in position. A striking rod 22 which extends through the tube 20 passes through and is secured to the spring diaphragm 14 by means of nuts 25 and 26. A nut or nuts 27 may be provided to weight the end of the striking rod if necessary or desired. The other end of the striking rod carries an adjustable armature 28. A nut 29 may be provided to lock the armature at any desired position relatively to said striking rod. Within the tube 20 is disposed a short piece of tubing 30 which serves to center the striking rod 22 and so prevent it from engaging the outer end of the tube 20. The ends of the coil 18 are secured to terminals 31, 32 as shown. In Fig. 1 I have shown a block 33 carrying conductors 34 and 34' as a convenient means for connecting the coil with the source of current. The cap 35 fits over the housing 17 and conceals and protects the armature 28. The screw 36, which is disposed concentric to the rod 22, passes through a boss 37 carried by the sounding diaphragm 9. It should be noted that the space between the striking rod 22 and the screw 36 may be readily adjusted to suit any requirements.

In the diagrammatic representation of an automobile power plant and electrical connections shown in Fig. 4, an ordinary multiple cylinder internal combustion engine is shown at 38 and the alternator housing at 39. I need not here describe the ignition circuit. It will suffice to say that suitable means is provided for directing current to the spark gaps in the engine cylinders The terminal 31 of the horn is connected to the insulated terminal 40 and the terminal 32 is electrically connected to the alternator housing 39.

The operation of the horn is as follows: When current is directed through coil 18 by pressing the push button 41, the armature 28 is drawn toward coil 18, thrusting the striking rod 22 into engagement with the end of screw 36 carried by the sounding diaphragm 9. When the current reverses, the armature is thrust away from the coil by the spring diaphragm 14 and again attracted. Every time the armature is attracted the striking rod 22 engages the screw 36, thereby causing the sounding diaphragm 9 to vibrate and set sound waves in motion. If the sounding diaphragm is held rigidly in place and the moving parts of the horn properly adjusted, a very good tone is produced. The push button 41 is preferably carried by the steering column of the automobile.

In the modified form of horn construction shown in Fig. 3, one end of the coil within the coil housing 42 is connected to the terminal 43. The other end is electrically connected to the striking rod 44 which carries an armature 45. The contact spring 46 carried by the diaphragm chamber end closure 47 carries the adjusting screw 48 which is disposed concentric to the striking rod 44. The rod 44 and the screw 48 preferably carry platinum contact points. The conductor 49 is connected to terminal 43 and the conductor 50 has electrical engagement with the spring 46 as indicated at 51. This type of horn construction is adapted for use with direct current. The operation is as follows: When current is directed through the bell coil within the housing 42, the armature 45 is attracted toward the coil opening the circuit at the point where the striking rod 44 engages the screw 48. The coil being deënergized, the rod 44 is thrown into engagement with the screw 48, whereupon the flow of current through the coil is reëstablished and the armature re-attracted.

While I have shown the spring support 14 in the form of a diaphragm, it is apparent to those skilled in the art that I might specify a spring of any suitable conformation therefor. The diaphragm is, however, the preferred form of spring.

While I have illustrated my horn in the particular embodiments herein shown and described, I do not, however, limit myself to these constructions but may employ any equivalents that might suggest themselves to those skilled in the art.

I claim as new and desire to secure by Letters Patent:

1. In combination, an alternating current generator, a horn comprising a sounding diaphragm, an electromagnet disposed behind said sounding diaphragm, said electromagnet being connected across the terminals of said alternating current generator, a movable armature for said electromagnet arranged to be actuated by said electromagnet when the latter is energized, and spring means connected with said armature arranged to normally hold the latter out of engagement with said sounding diaphragm, said armature adapted to vibrate between points on opposite sides of its normal position.

2. In combination, an alternating current generator, a horn comprising an electromagnet, an amplifying device, a sounding diaphragm disposed between said electromagnet and said amplifying device, said electromagnet being connected across the terminals of said alternating current generator, a movable armature for said electromagnet arranged to be actuated by said electromagnet when the latter is energized, and a spring diaphragm connected with the armature arranged to normally hold the latter out of engagement with the sounding diaphragm, said armature adapted to vibrate between points on opposite sides of its normal position.

3. In combination, an automobile engine, an alternating current ignition system for said automobile engine comprising an alternating current generator driven by said engine, a horn electrically connected with said generator, said horn comprising a sounding diaphragm, a bell magnet and an armature arranged to be actuated by said bell magnet, said armature comprising a striking rod arranged to strike the sounding diaphragm, and a spring normally holding said striking rod out of engagement with the sounding diaphragm, said armature adapted to vibrate between points on opposite sides of its normal position.

4. In combination, an alternating current ignition magneto, a horn comprising an electromagnet connected across the terminals of said magneto, a sounding diaphragm, an armature arranged to be actuated by said electromagnet, said armature comprising an impact member, and spring means arranged to normally retain the impact member out of engagement with the sounding diaphragm, said armature and spring means vibrating between points on either side of their respective normal positions and keeping in step with the electric impulses traversing the electromagnet winding.

5. In combination, an alternating current ignition magneto, a horn comprising an electromagnet connected across the terminals of said generator, a sounding diaphragm, an impact member arranged to be actuated by said electromagnet, and a spring connected with said impact member arranged to retain the latter out of engagement with the sounding diaphragm, said impact member and sounding diaphragm vibrating together between points on either side of their respective normal positions and keeping in step with the electric impulses traversing the electromagnet winding.

In witness whereof, I hereunto subscribe my name this 26th day of June, A. D., 1912.

HERBERT H. FREY.

Witnesses:
 A. G. McCaleb,
 Leonard W. Novander.